US009608372B2

(12) United States Patent
Hu

(10) Patent No.: US 9,608,372 B2
(45) Date of Patent: Mar. 28, 2017

(54) ELECTRICAL CARD CONNECTOR ASSEMBLY HAVING SEPARATE CONTACT MODULES

(71) Applicant: FOXCONN INTERCONNECT TECHNOLOGY LIMITED, Grand Cayman (KY)

(72) Inventor: Gang Hu, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/173,954

(22) Filed: Jun. 6, 2016

(65) Prior Publication Data

US 2016/0359267 A1 Dec. 8, 2016

(30) Foreign Application Priority Data

Jun. 5, 2015 (CN) .......................... 2015 1 0301909

(51) Int. Cl.
*H01R 13/62* (2006.01)
*H01R 13/633* (2006.01)
*H01R 12/71* (2011.01)

(52) U.S. Cl.
CPC ......... *H01R 13/633* (2013.01); *H01R 12/716* (2013.01)

(58) Field of Classification Search
CPC .. H01R 23/7005; H01R 9/096; H01R 13/633; H01R 13/518; H01R 23/7068; G06K 13/08; G06K 7/0021
USPC ........ 439/64, 65, 159, 160, 377, 540.1, 630, 439/631
See application file for complete search history.

(56) References Cited

U.S. PATENT DOCUMENTS 6,089,889 A * 7/2000 Chiou ................ H01R 13/6335
439/157
6,602,096 B1 8/2003 Kronestedt et al.
6,776,653 B1 * 8/2004 Hsiao ................... G06K 7/0034
439/541.5
(Continued)

FOREIGN PATENT DOCUMENTS

CN 201498678 6/2010
CN 201638982 11/2010
(Continued)

*Primary Examiner* — Thanh Tam Le
(74) *Attorney, Agent, or Firm* — Wei Te Chung; Ming Chieh Chang

(57) ABSTRACT

An electrical card connector assembly includes an electrical card connector and a printed circuit board. The electrical card connector includes: a first contact module and a second contact module assembled to the printed circuit board along a transverse direction perpendicular to a card-inserting direction; a shielding shell enclosing the contact modules to form a receiving room; a tray movably received in the receiving room along the insertion direction and having a first receiving groove receiving a first card corresponding to the first contact module and a second receiving groove receiving a second card corresponding to the second contact module; an ejector comprising a lever located at a lateral side of the first contact module and a cam located at a rear of the first contact module; and a detecting terminal positioned at a rear of the second contact module beside the cam along the transverse direction.

10 Claims, 4 Drawing Sheets

(56) References Cited

U.S. PATENT DOCUMENTS

| | | | | |
|---|---|---|---|---|
| 6,991,480 B2* | 1/2006 | Katayanagi | ........... | G06K 7/0043 |
| | | | | 439/159 |
| 7,040,908 B2* | 5/2006 | Kamata | .............. | H01R 13/6335 |
| | | | | 439/159 |
| 7,344,416 B2* | 3/2008 | Quijin | .................. | G06K 7/0034 |
| | | | | 439/540.1 |
| 7,431,618 B2* | 10/2008 | Jin | .......................... | H01R 27/00 |
| | | | | 439/630 |
| 7,556,534 B1* | 7/2009 | Ho | ..................... | H01R 13/6586 |
| | | | | 439/540.1 |
| 7,811,106 B2* | 10/2010 | Lin | ........................ | G06K 13/08 |
| | | | | 439/159 |
| 8,038,477 B2* | 10/2011 | Zhang | .................. | G06K 7/0021 |
| | | | | 439/630 |
| 8,662,907 B1* | 3/2014 | Lin | ........................ | G06K 13/08 |
| | | | | 439/159 |
| 8,827,727 B2* | 9/2014 | Yang | .................... | G06K 7/0021 |
| | | | | 439/153 |
| 8,827,749 B2* | 9/2014 | Kim | ..................... | G06K 7/0043 |
| | | | | 439/607.08 |
| 9,373,905 B2* | 6/2016 | Liu | ........................ | G06K 7/0052 |
| 2009/0267677 A1 | 10/2009 | Myers et al. | | |
| 2015/0056851 A1 | 2/2015 | Zhang | | |

FOREIGN PATENT DOCUMENTS

| | | |
|---|---|---|
| CN | 203312488 | 11/2013 |
| CN | 203747073 | 7/2014 |
| CN | 204361393 | 5/2015 |
| TW | M47516-102215912 | 4/2014 |
| TW | M500935-103216170 | 5/2015 |

* cited by examiner

ELECTRICAL CARD CONNECTOR ASSEMBLY HAVING SEPARATE CONTACT MODULES

BACKGROUND OF THE INVENTION

1. Field of the Invention

The present disclosure relates generally to an electrical card connector assembly, and more particularly to an electrical card connector assembly having separate contact modules.

2. Description of Related Arts

China Patent No. 203312488 discloses a card connector comprising an insulative housing, a cover enclosing the housing for forming an accommodation cavity, two groups of terminals, and a detecting terminal. A card connector assembly comprises the card connector and a tray having two card-receiving grooves.

An improved electrical card connector is desired to compensate for the defects in the previous technology.

SUMMARY OF THE INVENTION

Accordingly, an object of the present invention is to provide an electrical card connector assembly having separate terminal modules.

To achieve the above object, an electrical card connector assembly comprises an electrical card connector and a printed circuit board, the electrical card connector comprising: a first insulative housing and a second insulative housing separate from each other; a plurality of conductive terminals comprising a plurality of first conductive terminals affixed to the first insulative housing to form a first contact module and a plurality of second conductive terminals affixed to the second insulative housing to form a second contact module, the first contact module and the second contact module assembled to the printed circuit board along a transverse direction perpendicular to an insertion direction; a shielding shell enclosing the insulative housing to form a receiving room; a tray movably received in the receiving room along the insertion direction and having a first receiving groove receiving a first card corresponding to the first contact module and a second receiving groove receiving a second card corresponding to the second contact module; an ejector comprising a lever located at a lateral side of the first contact module and a cam located at a rear of the first contact module and connected with the lever; and a detecting terminal positioned at a rear of the second contact module beside the cam along the transverse direction.

Other objects, advantages and novel features of the invention will become more apparent from the following detailed description when taken in conjunction with the accompanying drawings.

DETAILED DESCRIPTION OF THE PREFERRED EMBODIMENT

Figure 1:
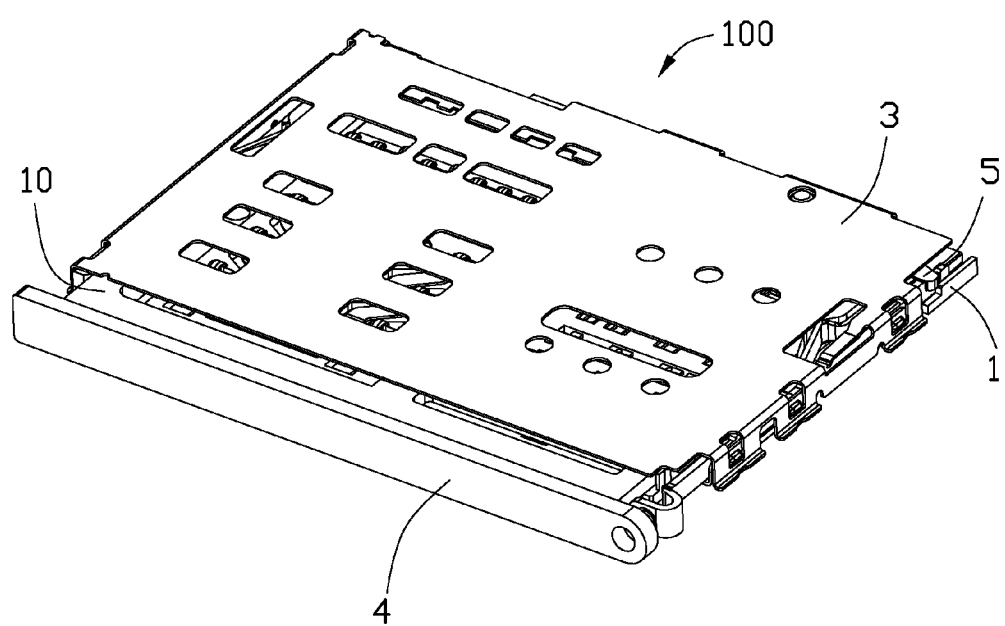
FIG. 1 is a perspective, assembled view of an electrical card connector of the present invention.

Reference will now be made in detail to the preferred embodiment of the present invention.

Referring to FIGS. 1 to 4, an electrical card connector 100 defines an insertion direction and a transverse direction perpendicular to the insertion direction. The electrical card connector 100 includes a printed circuit board 7, an insulative housing 1, a number of conductive terminals 2 received in the insulative housing 1, a shielding shell 3 enclosing the insulative housing 1 and forming a receiving room 10, a tray 4 movably received in the receiving room 10 along the insertion direction, an ejector 5 mounted to one side of the insulative housing 1, and a detecting terminal 6 mounted to the other side of the insulative housing 1.

Figure 2:
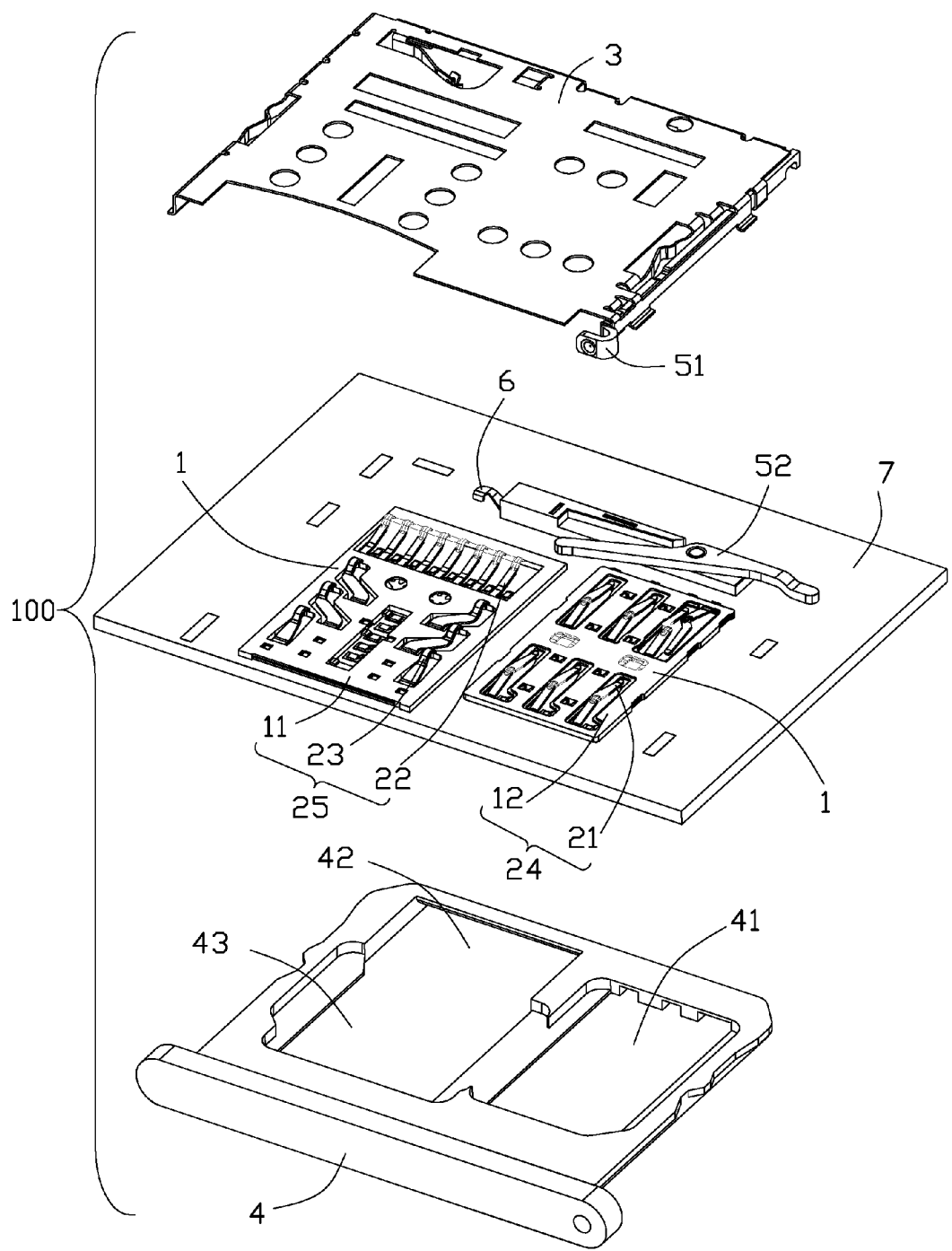
FIG. 2 is a partial perspective, exploded view of the electrical card connector of the present invention.

Referring to FIGS. 1 and 2, the insulative housing 1 are divided into a first insulative housing 11 and a second insulative housing 12. The first insulative housing 11 and the second insulative housing 12 are rectangular.

The conductive terminals 2 include a number of first conductive terminals 21 located in two rows along the transverse direction and at a right side of the first insulative housing 11, a number of second conductive terminals 22 located in a row along the transverse direction and at a left rear side of the second insulative housing 12, and a number of third terminals 23 located in two rows along the insertion direction and at a left front side of the second insulative housing 12. The first conductive terminals 21 and the third conductive terminals 23 are contacted with a micro SIM card. The second conductive terminals 22 are contacted with micro SD card. The first conductive terminals 21 and the first insulative housing 11 are configured to a first contact module 24. The second conductive terminals 22 affixed to the second insulative housing 12, the third conductive terminals 23 and the second insulative housing 12 are configured to a second contact module 25. The first contact module 24 and the second contact module 25 are assembled to the printed circuit board 7 and arranged transversely.

The shielding shell 3 is attached to the printed circuit board 7. Referring to FIGS. 1 to 2, the dimension of the tray 4 in the insertion direction is smaller than that in the transverse direction. The tray 4 is corresponding with the arrangement of the conductive terminals 2. The tray 4 includes a first receiving groove 41 located at right therein and corresponding to the first conductive terminals 21, a second groove 42 located at left therein and corresponding to the second conductive terminals 22, and a third receiving groove 43 located at left therein and partially overlapping the second receiving groove 42. The third receiving groove 43 is corresponding to the third conductive terminals 23. The first receiving groove 41 and the third receiving groove 43 are used to receive micro SIM cards. The second receiving groove 42 is used to receive a SD card. The first conductive terminals 21 and the third conductive terminals 23 are contacted with the micro SIM cards. The second conductive terminals 22 and the third conductive terminals 23 could not be used together because the third receiving groove 43 partially overlaps with the second receiving groove 42.

Referring to FIG. 2, the ejector 5 includes a lever 51 located at a right side of the receiving room 10, and a cam 52 driven by the lever 51 and located at a rear end of the first receiving groove 41. The detecting terminal 6 is attached to the printed circuit board 7 and located at a rear end of the second receiving groove 42. The detecting terminal 6 is located parallel to the cam 52. In other preferred embodiments, the lever 51 is located at the left of the receiving room 10. The detecting terminal 6 could be located at the rear end of the printed circuit board 7 and at the right of the cam 52 correspondingly. The detaching terminal 6 is resiliently movable along a up-and-down direction to match with the shielding shell 3 for ensuring the tray 4 locating at a right position in the receiving room 10.

The tray 4 includes two receiving grooves at least in the transverse direction to make the dimension of the receiving room 10 in the transverse direction larger than that in the insertion direction. The detecting terminal 6 and the cam 52 are located at different sides in the rear end of the receiving room 10. The detecting terminal 6 and the cam 52 are mutual noninterference which optimizes the electrical card connector 100 overall space layout. The first contact module 24 and the second contact module 25 ensure the co-planarity of the electrical card connector 100.

Figure 3:
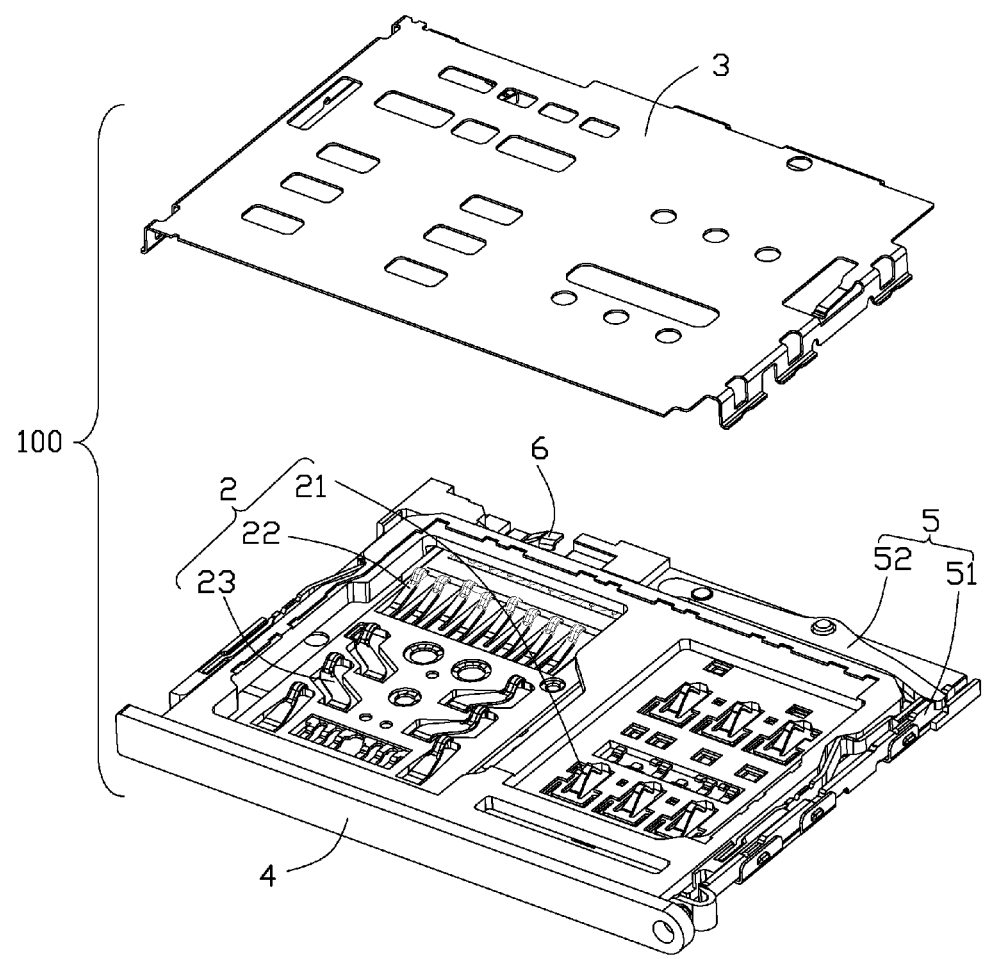
FIG. 3 is a partial perspective, exploded view of the electrical card connector of the present invention in a second preferred embodiment.
Figure 4:
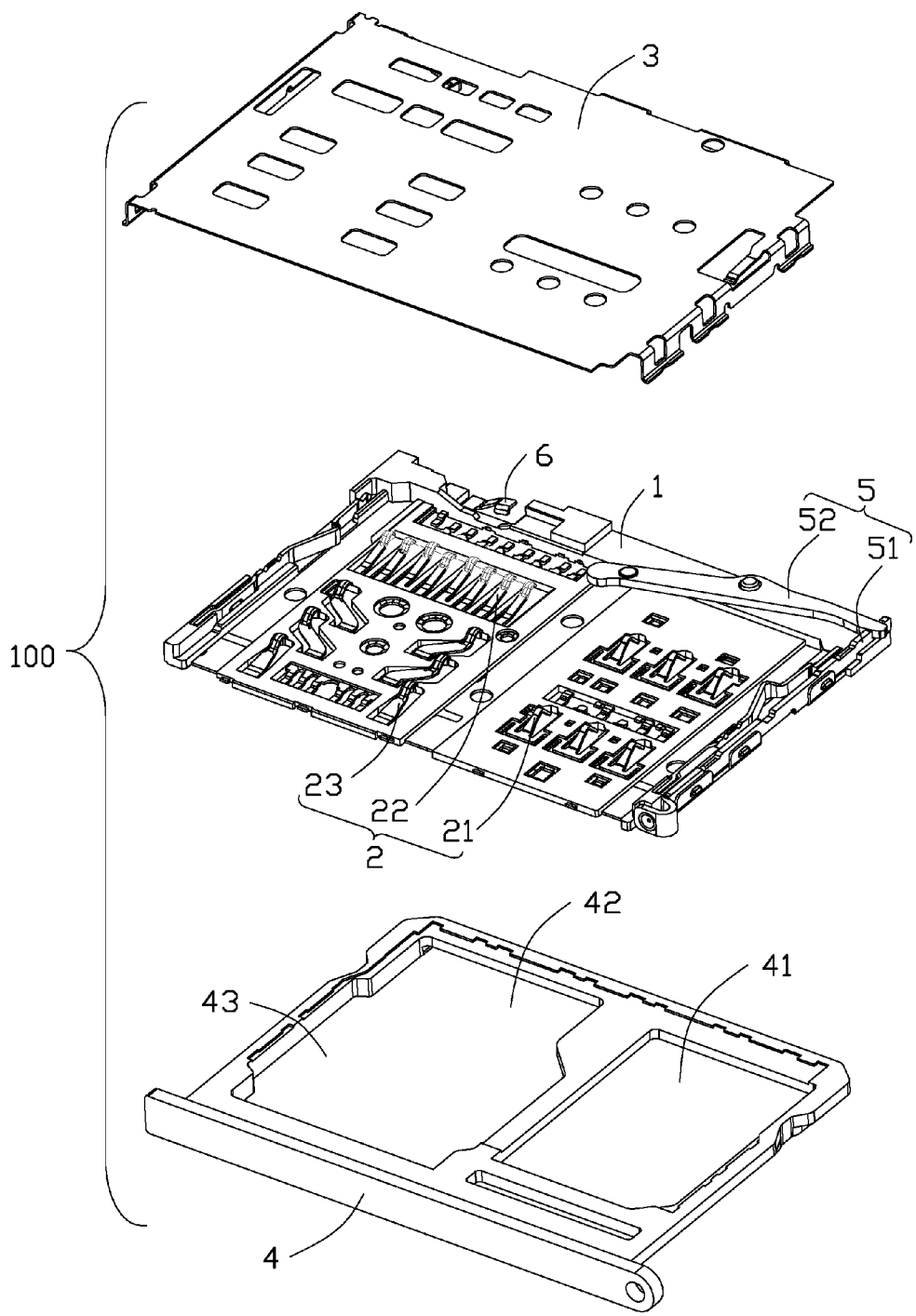
FIG. 4 is a perspective, exploded view of the electrical card connector of the present invention in the second preferred embodiment.

Referring to FIGS. 3 and 4, the second preferred embodiment is shown. The insulative housing 1 is a whole entity. The first conductive terminals 21, the second conductive terminals 22 and the third conductive terminals 23 are insert molded with the insulative housing 1.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector assembly comprising: an electrical card connector and a printed circuit board, the electrical card connector comprising:
    a first insulative housing and a second insulative housing separate from each other;
    a plurality of conductive terminals comprising a plurality of first conductive terminals affixed to the first insulative housing to form a first contact module and a plurality of second conductive terminals affixed to the second insulative housing to form a second contact module, the first contact module and the second contact module assembled to the printed circuit board along a transverse direction perpendicular to an insertion direction;
    a shielding shell enclosing the insulative housing to form a receiving room;
    a tray movably received in the receiving room along the insertion direction and having a first receiving groove receiving a first card corresponding to the first contact module and a second receiving groove receiving a second card corresponding to the second contact module;
    an ejector comprising a lever located at a lateral side of the first contact module and a cam located at a rear of the first contact module and connected with the lever; and
    a detecting terminal positioned at a rear of the second contact module beside the cam along the transverse direction.

2. The electrical card connector assembly as claimed in claim 1, wherein the dimension of the receiving room in the transverse direction is larger than that of the receiving room along the insertion direction.

3. The electrical card connector assembly as claimed in claim 1, wherein the tray comprises a third receiving groove partially overlapping with the second receiving groove, and the conductive terminals comprise a plurality of third conductive terminals affixed to the second insulative housing and extending into the third receiving groove.

4. The electrical card connector assembly as claimed in claim 3, wherein the first conductive terminals are located at a right side of the first contact module, the second conductive terminals are located at a left side of the second contact module, and the third conductive terminals are located at a front of the second contact module.

5. The electrical card connector assembly as claimed in claim 4, wherein the first conductive terminals are arranged in two rows along the insertion direction, the third conductive terminals are arranged in two rows along the transverse direction, and the second conductive terminals are arranged in a row along the transverse direction behind the third conductive terminals.

6. An electrical card connector comprising:
    a first contact module and a second contact module side by side arranged with each other in a transverse direction, each of said first contact module and said second contact including a plurality of contacts insert-molded within an insulative housing, one of said first contact module and said second contact module being equipped with two type contacts so as to be adapted to be selectively mated with two different card mutually exclusively;
    a metallic shell covering both said first contact module and said second contact module; and
    an ejector spaced from the first contact module and the second contact module and being not connected to the insulative housing of either the first contact module and the second contact module in a front-to-back direction perpendicular to said transverse direction, and including a pivotal actuator.

7. The electrical card connector as claimed in claim 6, wherein the insulative housing of said first contact module and the insulative of said second contact module are separated from each other in the transverse direction.

8. The electrical card connector as claimed in claim 6, wherein both said first contact module and said second contact module are mounted upon a same printed circuit board on which the shell is attached.

9. The electrical card connector as claimed in claim 6, wherein an operation shaft is associated with the metallic shell and moveable along the front-to-back direction and linked to the actuator.

10. The electrical card connector as claimed in claim 6, wherein a receiving room is formed between the shell and both the first and second contact modules to receive a tray.

* * * * *